US011236720B2

(12) United States Patent
Tona et al.

(10) Patent No.: US 11,236,720 B2
(45) Date of Patent: Feb. 1, 2022

(54) METHOD FOR CONTROLLING A WAVE-ENERGY-CONVERTER SYSTEM TAKING INTO ACCOUNT UNCERTAINTIES

(71) Applicant: IFP Energies nouvelles, Rueil-Malmaison (FR)

(72) Inventors: Paolino Tona, Rueil-Malmaison (FR); Hoai-Nam Nguyen, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 331 days.

(21) Appl. No.: 16/580,915

(22) Filed: Sep. 24, 2019

(65) Prior Publication Data

US 2020/0095973 A1 Mar. 26, 2020

(30) Foreign Application Priority Data

Sep. 25, 2018 (FR) .................................. 18/58.714

(51) Int. Cl.
*F03B 15/00* (2006.01)
*F03B 13/18* (2006.01)
*G06F 17/16* (2006.01)

(52) U.S. Cl.
CPC .......... *F03B 15/00* (2013.01); *F03B 13/1845* (2013.01); *G06F 17/16* (2013.01); *F05B 2270/705* (2013.01)

(58) Field of Classification Search
CPC ...... F03B 15/00; F03B 13/1845; G06F 17/16; F05B 2270/705
See application file for complete search history.

(56) References Cited

U.S. PATENT DOCUMENTS

| | | | |
|---|---|---|---|
| 10,815,959 B2 * | 10/2020 | Tona | F03B 15/00 |
| 2009/0008942 A1 | 1/2009 | Clement et al. | |
| 2014/0084586 A1 | 3/2014 | Henwood et al. | |
| 2017/0214347 A1 | 7/2017 | Saupe et al. | |

FOREIGN PATENT DOCUMENTS

| | | |
|---|---|---|
| FR | 2876751 A1 | 4/2006 |
| FR | 2973448 A1 | 10/2012 |
| FR | 3019235 A1 | 10/2015 |
| WO | 2009/081042 A1 | 7/2009 |

OTHER PUBLICATIONS

Preliminary Search Report for FR 18/58.714, dated Feb. 20, 2019.
(Continued)

*Primary Examiner* — Viet P Nguyen
(74) *Attorney, Agent, or Firm* — Fitch, Even, Tabin & Flannery LLP

(57) ABSTRACT

The present invention is a method for controlling a wave-energy-converter system, wherein the gains of a control law having a proportional component are optimally determined in terms of the harvest of energy, and are robust with respect to uncertainties in the dynamics of the wave-energy-converter system. The harvest of energy is maximized for the worst case described by the uncertainties, by solving a semidefinite-positive optimization problem.

14 Claims, 4 Drawing Sheets

(56) References Cited

OTHER PUBLICATIONS

Francesco Fusco et al. "A Simple and Effective Real-Time Controller for Wave Energy Converters", IEEE Transactions on Sustainable Energy, IEEE, USA, vol. 4, No. 1, (Jan. 1, 2013), pp. 21-30, XP011479415, ISSN: 1949-3029, DOI: 10.1109/TSTE.2012. 2196717.
"Chairy G et al: Self-Adaptive Control of a Piston Wave Absorber", Proceedings of The International Offshore and Polar Engineeringconfer, XX, XX, vol. 1, (May 24, 1998), pp. 127-133, XP008003240.
Edo Abraham et al: "Optimal Active Control and Optimization of a Wave Energy Converter", IEEE Transactions on Sustainable Energy, IEEE, USA, vol. 4, No. 2, 1 avri I 2013 (Apr. 1, 2013), pp. 324-332, XP011497607.
Giorgio Bacelli et al: "A control system for a self-reacting point absorber wave energy converter subject to constraints", (Aug. 1, 2011), XP055153399, DOI: 10.3182/20110828-6-IT-1002.03694 Extracted from the Internet: URL: http://eprints.nuim.ie/3555.
Tom Nathan et al: "Experimental Confirmation of Nonlinear-Model-Predictive Control Applied Offline to a Permanent Magnet Linear Generator for Ocean-Wave Energy Conversion", IEEE Journal of Oceanic Engineering, IEEE Service Center, Piscataway, NJ, US, vol. 41, No. 2, (Apr. 1, 2016), pp. 281-295, XP011606060.

\* cited by examiner

METHOD FOR CONTROLLING A WAVE-ENERGY-CONVERTER SYSTEM TAKING INTO ACCOUNT UNCERTAINTIES

CROSS REFERENCE TO RELATED APPLICATIONS

Reference is made French Application No. 18/58.714 filed Sep. 25, 2018, which is incorporated herein by reference in its entirety.

BACKGROUND OF THE INVENTION

Field of the Invention

The invention relates to devices for converting the energy of waves into electrical or hydraulic energy.

Description to the Prior Art

Sources of renewable energy have seen a substantial amount of interest. The fact that they are clean, free and inexhaustible is a major advantage in a world beset by the inexorable decrease in available fossil fuels and increasingly conscious of the need to preserve the planet. Among these sources, wave energy, which is a relatively overlooked source relative to those that have received more media attention (such as wind or solar power) has a contribution to play in the indispensable diversification of the exploitation of renewable energy. The devices commonly referred to as "wave-energy converters" are particularly of interest, because they allow electricity to be generated from this renewable energy source (the potential and kinetic energy of waves) without emission of greenhouse gases. They are particularly suitable for delivering electricity to isolated insular sites. For example, patent applications FR 2876751, FR 2973448 and WO 2009/081042 describe apparatuses for capturing the energy produced by tidal flow. These devices are composed of a floating holder on which a pendulum that is mounted to be movable with respect to where the floating holder is placed. The relative movement of the pendulum with respect to the floating holder is used to produce electrical energy by use of a power take-off (for example an electrical machine). The power take-off operates as a generator, producing or coupling a force that resists the movement of the floating holder and thus generating power, and, at the same time, placing the pendulum in resonance with the waves.

The movement of the floating holder is therefore controlled by the power take-off in order to promote the harvest of energy. With the goal of improving the efficiency and therefore the viability of devices for converting the energy of waves into electrical energy, many control methods, of varying complexity and performance levels, have been proposed in the past. The common objective of these control methods is to generate as much power as possible by acting on the power take-off (PTO), i.e. the system that converts the mechanical energy that results from the action of the waves into electrical energy.

Proportional (P) and proportional-integral (PI) controls are the simplest and most commonplace forms of control for wave-energy-converter systems. In the first case, the force applied by the power take-off (PTO) or secondary converter to the movable portion (a float for example) or primary converter of the wave-energy-converter system, is a simple feedback proportional to the speed of the movable portion. In the second case, a term proportional to the relative movement (position) of the movable portion is added. The optimal values of the parameters (gains) allowing the harvest of energy to be maximized for a regular swell (and, by extension, for a sea state for which it is possible to define a dominant swell frequency) may be calculated with ease (analytically) in the case where the dynamics of the wave-energy-converter system are fully known.

For example, PI control is a well-known approach to the control of wave-energy-converter systems. For example, the document Ringwood, J.V. Control optimisation and Parametric Design, in Numerical Modelling of Wave Energy Converters: State-of-the art Techniques for Single WEC and Converter Arrays (M. Folly Ed.), Elsevier, 2016 describes such an approach. Versions that are adaptive with respect to the sea state (that is the parameters of which vary to account for the sea state) have been presented in the literature, for example in the following documents:

Whittaker, T., Collier, D., Folley, M., Osterried, M., Henry, A., & Crowley, M. (2007, September). The Development of Oyster-A Shallow Water Surging Wave Energy Converter. In Proceedings of the 7th European Wave and Tidal Energy Conference, Porto, Portugal (pp. 11-14).

Hansen, Rico H and Kramer, Morten M., "Modelling and Control of the Wavestar Prototype". In: Proceedings of 2011 European Wave and Tidal Energy Conference (2011)

Hals, J., Falnes, J. and Moan, T., "A Comparison of Selected Strategies for Adaptive Control of Wave Energy Converters". In: J. Offshore Mech. Arct. Eng. 133.3 (2011)

In all these methods, the approach used is gain scheduling. A set of gains or optimal parameters (one gain for P control, two gains for PI control) is calculated off-line, analytically or numerically, for a set of sea states, in order to populate maps (tables) of sea-state-dependent gains. In the methods described in these documents, PI gains are always updated on the basis of estimations averaged over time windows of several minutes (for example of between 10 and 30 minutes). These methods therefore do not allow the gains to be adapted "wave to wave", i.e. at a frequency that would allow real-time control (for example a frequency comprised between 10 and 100 Hz, i.e. a sampling period comprised between 10 and 100 ms). Thus, the high reaction time of these methods does not allow the wave-energy-converter system to be controlled optimally and the power generated is therefore not optimal.

In addition, in the above prior art there are no examples of control methods that allow P or PI control-law gains that are optimal from the point of view of maximization of the harvested energy to be calculated in the presence of uncertainties in the dynamics of the wave-energy-converter system, irrespectively of whether these uncertainties are present in the dynamics of the primary converter (movable portion, such as a float) or of the secondary converter (PTO).

An example of a method for controlling a wave-energy-converter system that maximizes generated power, based on a model-based predictive control scheme, is described in the patent application of the applicant FR 3019235 (US 2017/0214347).

Another example of a control method allowing, with a simpler control structure, namely a proportional-integral (PI) structure, the power generated to be adaptively maximized depending on variations in sea state, is described in the French patent application of the applicant having the application number 17/52.337.

In these two particular cases, a dynamic model of the wave-energy-converter system is used to synthesize the control. If the fidelity (to reality) of this dynamic model is not sufficient, the performance of the control method will be affected. Specifically, the methods described in these patent applications are not robust with respect to uncertainties in the wave-energy-converter system, irrespectively of whether these uncertainties relate to the movable portion or to the power take-off.

To mitigate these drawbacks, the present invention relates to a method for controlling a wave-energy-converter system, wherein the gains of a control law having a proportional component (for example a proportional P or proportional-integral PI control law) are determined in a manner that is optimal in terms of the harvest of energy, but also robust with respect to uncertainties in the dynamics of the wave-energy-converter system, irrespectively of whether these uncertainties are in the dynamics of the movable portion or in the dynamics of the power take-off. To do this, the harvest of energy is maximized for the worst case described by the uncertainties, by solving a semidefinite-positive (and therefore convex) optimization problem for which a single solution exists.

SUMMARY OF THE INVENTION

The invention relates to a method for controlling a wave-energy-converter system that converts the energy of sea swell into electrical or hydraulic energy. The wave-energy-converter system comprises at least one movable float element linked to a power take-off, and the movable float making an oscillatory movement with respect to the power take-off. The following steps are carried out:

a) at least one of the position, speed and acceleration of the movable float are measured;

b) the force exerted by the swell on the movable float is estimated by use of the measurement of at least one of the position and the speed of the movable float;

c) at least one dominant frequency of the force exerted by the swell on the movable float is determined, preferably by use of an unscented Kalman filter;

d) a control value is determined for the force exerted by the power take-off on the movable float in order to maximize the power generated by the power take-off by implementing the following steps:

i) for the at least one determined dominant frequency, the intrinsic resistance and reactance of the movable float and the uncertainty intervals of the intrinsic resistance and reactance of the power take-off are determined;

ii) at least one coefficient of a variable-gain control law having a proportional component is determined by use of solving of a semidefinite-positive optimization of the maximization of the power generated by the power take-off, the semidefinite-positive optimization accounting for the intrinsic resistances and reactance of the movable float and the uncertainty intervals of the intrinsic resistance and reactance of the power take-off; and e) the power take-off is controlled by use of the control value.

According to one embodiment, the semidefinite-positive optimization optimizes the worst case of operation of the wave-energy-converter system, which is defined by use of the uncertainty intervals.

According to one implementation, the semidefinite-positive optimization determines at least the impedance of the control law, and the coefficient of a control law is determined from the impedance of the control law.

Advantageously, the semidefinite-positive optimization problem is defined by an equation of the type:

$$\min_{\gamma, R_c, X_c} \{\gamma\},$$

such that $$\begin{bmatrix} \gamma & R_i + R_m R_c - X_m X_c & X_i + R_m X_c + X_m R_c \\ R_i + R_m R_c - X_m X_c & R_m R_c - X_m X_c & 0 \\ X_i + R_m X_c + X_m R_c & 0 & R_m R_c - X_m X_c \end{bmatrix} \succcurlyeq 0,$$

$$\begin{bmatrix} \gamma & R_i + R_M R_c - X_M X_c & X_i + R_M X_c + X_M R_c \\ R_i + R_M R_c - X_M X_c & R_M R_c - X_M X_c & 0 \\ X_i + R_M X_c + X_M R_c & 0 & R_M R_c - X_M X_c \end{bmatrix} \succcurlyeq 0,$$

where $R_i$ is the resistance of the movable float, $X_i$ is the internal reactance of the movable float, $R_m$ is the lower limit of the uncertainty in the resistance of the power take-off, $R_M$ is the upper limit of the uncertainty in the resistance of the power take-off, $R_c$ is the real part of the impedance of the control law, $X_c$ is the imaginary part of the impedance of the control law, $X_m$ is the lower limit of the uncertainty in the internal reactance of the power take-off, $X_M$ is the upper limit of the uncertainty in the internal reactance of the power take-off.

Advantageously, the control law is a proportional control law, and the coefficient $K_p$ of the control law is determined via an equation $K^*_p(\hat{w}_{ex}) = R^*_c(\hat{w}_{ex})$, where $\hat{w}_{ex}$ is the determined dominant frequency of the swell, $K^*_p$ is the optimal value of the coefficient $K_p$ and $R^*_c$ is the optimal value of the real part of the impedance of the control law.

Preferably, the proportional control law is written: $f_u(t) = K_p v(t)$ where $f_u$ is the force applied by the power take-off on the movable float, and $v$ is the speed of the movable float with respect to the power take-off.

Alternatively, the control law is a proportional-integral control law, and the coefficients $K_p$ and $K_i$ of the control law are determined from equations $$\begin{cases} K^*_p(\hat{\omega}_{ex}) = R^*_c(\hat{\omega}_{ex}) \\ K^*_i(\hat{\omega}_{ex}) = -\hat{\omega}_{ex} X^*_c(\hat{\omega}_{ex}) \end{cases}$$

where $\hat{w}_{ex}$ is the determined dominant frequency of the swell, $K^*_p$ is the optimal value of the coefficient $K_p$, $R^*_c$ is the optimal value of the real part of the impedance of the control law, $K^*_i$ is the optimal value of the coefficient $K_i$ and $X^*_c$ is the optimal value of the imaginary part of the impedance of the control law.

Preferably, the PI control law is written as an equation:

$$f_u(t) = K_p v(t) + K_i p(t)$$

where $f_u(t)$ is the control of the force exerted by the power take-off on the movable float, $v(t)$ is the speed of the movable float, and $p(t)$ is the position of the movable float.

According to one aspect, the power generated by the power take-off is maximized by accounting for the efficiency of the power take-off.

According to one feature, the dominant frequency of the force exerted by the swell on the movable float is determined by a model modelling the force exerted by the swell on the movable float as a sinusoidal signal, or as the sum of two sinusoidal signals.

According to one embodiment, the position and speed of the movable float is estimated using a dynamic model that models the variation in the position and speed of the movable float.

Advantageously, the dynamic model comprises a model of the radiation force.

According to one implementation, the power take-off is an electrical machine or a hydraulic machine.

Furthermore, the invention relates to a wave-energy-converter system that converts the energy of sea swell into electrical or hydraulic energy, the wave-energy-converter system comprising at least one movable float linked to a power take-off, and the movable float making an oscillatory movement with respect to the power take-off. The wave-energy-converter system comprises a control for controlling the wave-energy-converter system able to implement the control method according to one of the preceding features.

BRIEF DESCRIPTION OF THE DRAWINGS

Other features and advantages of the method and of the device according to the invention will become apparent upon reading the following description of nonlimiting exemplary embodiments with reference to the appended figures described below.

DETAILED DESCRIPTION OF THE INVENTION

Figure 1:
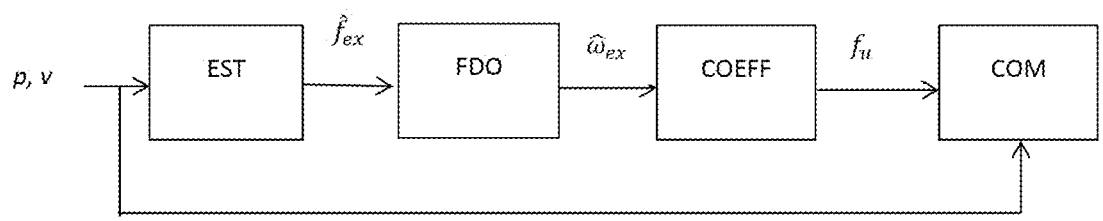
FIG. 1 illustrates the steps of the method according to one embodiment of the invention.

The invention relates to a method for controlling a wave-energy-converter system that comprises at least one movable float (for example a float) that interacts with at least one power take-off (PTO). The movable float makes an oscillatory movement with respect to the power take-off, under the action of the waves (or sea swell) and the power take-off. The power take-off converts the mechanical energy of the movement of the movable float into electrical energy. With this goal, the power take-off may be a simple electrical machine or a more complex device that includes other machines, such as a hydraulic machine. The power take-off may be considered to be the actuator via which the control system controls the operation of the wave-energy-converter system.

Notations

In the description, the following notations are used:

$f_u$: setpoint of the force to be exerted by the power take-off on the movable float $f_{ex}$: force exerted by the swell on the movable float $f_{pto}$: force actually exerted by the power take-off on the movable float p: position of the movable means with respect to its point of equilibrium v: speed of the movable float a: acceleration of the movable float w: angular frequency of oscillation of the movable float, for which the calculations of the gains of the robust optimal control law are calculated M: mass of the movable float $Z_r$: radiation impedance; it is a parameter, dependent on frequency and determined experimentally or issued from the calculation of the hydrodynamic coefficients of the movable float, that makes possible accounting for the effect of radiation, whereby the movement of the movable float in the water creates a radiated wave that damps the movement $K_h$: coefficient of hydrostatic stiffness $B_r$: radiation resistance, is the real part of the radiation impedance $M_r$: added mass; is a parameter, dependent on frequency and determined experimentally or issued from the calculation of the hydrodynamic coefficients of the movable float, that possible accounting for an effect that increases the equivalent mass of the movable float, caused by water particles that are entrained by its movement $M_\infty$: added mass at infinitely high frequency $P_a$: average power generated by the wave-energy-converter system t: continuous time η: efficiency of the energy conversion, with $\eta_p$: efficiency of the motor of the power take-off; it is a question of a datum supplied by the manufacturer or of a datum determined experimentally $\eta_n$: efficiency of the generator of the power take-off; it is a question of a datum supplied by the manufacturer or of a datum determined experimentally $Z_i$: intrinsic impedance of the movable float of the wave-energy-converter system, which parameter is known, dependent on frequency, issued from a model of the movable float based on linear wave theory, and determined from the hydrodynamic coefficients of the movable float or optionally experimental measurements $R_i$: intrinsic resistance of the movable float of the wave-energy-converter system, that is the real part of the intrinsic impedance $X_i$: intrinsic reactance of the movable float of the wave-energy-converter system, that is the imaginary part of the intrinsic impedance $R_{pto}$: intrinsic resistance of the power take-off $X_{pto}$: intrinsic reactance of the power take-off $K_p$: coefficient of proportionality of the P, PI, or PID control law $K_i$: integral coefficient of the PI or PID control law $K_d$: derivative coefficient of the PID control law $Z_c$: impedance of the control (or loading) law $R_c$: resistance of the control (or loading) law, i.e. the real part of the impedance of the control law $X_c$: reactance of the control law, i.e. the imaginary part of the impedance of the control law A: amplitude of the swell $\hat{w}_{ex}$: estimation of the dominant frequency of the wave $\hat{f}_{ex}$: estimation of the force exerted by the wave on the movable float $R_m$: lower limit of the uncertainty in the intrinsic resistance of the power take-off $R_M$: upper limit of the uncertainty in the intrinsic resistance of the power take-off $X_m$: lower limit of the uncertainty in the intrinsic reactance of the power take-off $X_M$: upper limit of the uncertainty in the intrinsic reactance of the power take-off $R_{im}$: lower limit of the uncertainty in the intrinsic resistance of the movable float of the wave-energy-converter system $R_{iM}$: upper limit of the uncertainty in the intrinsic resistance of the movable float of the wave-energy-converter system $X_{im}$: lower limit of the uncertainty in the intrinsic reactance of the movable float of the wave-energy-converter system $X_{iM}$: upper limit of the uncertainty in the intrinsic reactance of the movable float of the wave-energy-converter system $\phi$: phase shift of the signal $T_s$: sampling period $P_x$: covariance matrix of x(k)

k: discrete time

With respect to these notations, estimated values are generally marked by a circumflex accent. Values marked with an asterisk correspond to optimal values.

In the rest of the description and in the claims, the terms waves, tidal flow, and swell are considered to be equivalent.

The invention relates to a method for controlling a wave-energy-converter system. FIG. 1 shows the various steps of the method according to the invention:
1. Taking one or more measurements of the position and/or speed of the movable element (p, v)
2. Estimating the force exerted by the waves (EST)
3. Determining the dominant frequency (FDO)
4. Determining the control value (COEFF)
5. Controlling the power take-off (COM)

Steps 1 to 5 are preferably carried out in real-time, in a real-time loop. However, according to one embodiment of the invention, the determination of the control value may comprise steps carried out beforehand.

Advantageously, the control method according to the invention may be implemented by performing computations, for example by a computer or a processor, and in particular an on-board processor.

Step 1) Taking One or More Measurements of the Position and/or Speed of the Movable Float (p, v)

In this step, the position and/or speed of the movable floats are measured. The position corresponds to the movement (for example distance or angle) with respect to the equilibrium position of the movable float. These measurements may be carried out by sensors, which are generally implemented on a wave-energy-converter system with a view to monitoring and/or supervising it.

According to one implementation of the invention, in this step, it is also possible to measure or estimate the acceleration of the movable float, because this measurement or estimation may be used in the following steps of the method according to the invention. For example, the acceleration may be measured by an accelerometer placed on the movable float.

Step 2) Estimating the Force Exerted by the Swell (EST)

In this step, the force exerted by the swell on the movable float is estimated in real-time. The swell is estimated based on the available measurements (position and/or speed and/or acceleration) obtained in the preceding step. The force exerted by the swell on the movable float is estimated on-line and in real-time, in order to be able to implement a control in real-time. With the goal of obtaining a control having an optimal response time, a fast estimating method may be chosen.

For this step of the method, any type of estimation of the force exerted by the swell on the movable float may be envisioned.

According to one embodiment of the invention, the force exerted by the swell on the movable float may be estimated by an estimator based on a dynamic model of the wave-energy-converter system. In this case, it is possible to construct a dynamic model of the wave-energy-converter system. The dynamic model represents the dynamic behavior, expressing the movement of the constituent elements of the wave-energy-converter system under the action of the swell and under the action of the force control fed to the power take-off. The dynamic model is a model that relates the speed of the movable float to the force exerted by the waves on the movable float and to the force control fed to the power take-off, which is in its turn translated into a force exerted by said power take-off on the movable float.

According to one embodiment of the invention, the dynamic model may be obtained by applying the fundamental principles of dynamics to the movable means of the wave-energy-converter system. For this application, the force exerted by the swell on the movable means and the force exerted by the power take-off on the movable means are in particular taken into account.

According to one implementation of the invention, it is possible to consider a wave-energy-converter system with a floating portion (movable float) the translational or rotational oscillating movement of which is constrained to a single dimension. It may then be assumed that the translational or rotational movement may be described by a linear model in state form that includes the dynamics of the float with its interaction with the swell and the dynamics of the power take-off (PTO) that forms the actuator of the system.

In the rest of the description, only a unidirectional movement is considered for the dynamic model. However, the dynamic model may be developed for a multidirectional movement.

In the prior art, the power take-off is generally considered not to have dynamics, that is $W_{pto}(jw)=1$, $\forall w$, where $W_{pto}$ is the transfer function between $f_u$ and $f_{pto}$, this considerably simplifying the calculation of the optimal value of the force setpoint $f_u(t)$. In fact, depending on the type of power take-off used, its dynamics may prove to be slow with respect to those of the primary converter (movable float) of the wave-energy-converter system and to be impossible to neglect. According to the invention, the dynamic model may therefore take the dynamics of the power take-off into account in the model, in the same frequency form as the main dynamics of the wave-energy-converter system:

$$W_{pto}(jw)=R_{pto}(w)+jX_{pto}(w)$$

According to one embodiment, it is possible to estimate, in real-time, the force exerted by the waves on the movable float by implementing a method for determining the excitation force exerted by the incident swell on a movable float of a wave-energy-converter system by use of a model of the radiation force, such as the model described in patent application FR 3049989 (WO 2017/174244). It will be recalled that the radiation force is the force applied to the movable float and is generated by the very movement of the movable float, contrary to the excitation force of the swell, which is generated by the swell alone.

Step 3) Determining the Dominant Frequency (FDO)

In this step, at least one dominant frequency of the force (determined in the preceding step) exerted by the swell on the movable float is determined. The dominant frequency is the frequency corresponding to the peak (maximum) of its spectrum.

In this step of the control method according to the invention, any type of method for determining the dominant frequency may be envisioned.

According to one embodiment (and such as described in the French patent application the application number of which is 17/52337), the dominant frequency may be determined by means of an unscented Kalman filter (UKF). A UKF is based on the theory of "unscented" transformation, which allows an estimator to be obtained for a nonlinear system without needing to linearize it beforehand for the application of the filter. The UKF uses a statistical distribution of the state, which is propagated through the nonlinear equations. Such a filter has the advantage of enabling stability, and therefore robustness, in the estimation.

According to one embodiment of the invention, the excitation force of the waves may be modelled as a time-varying sinusoidal signal:

$$f_{ex}(t) = A(t)\sin(w(t)t + \phi(t))$$

where $A(t)$, $w(t)$ and $\phi(t)$ are the amplitude, frequency and phase shift of the signal, respectively. It is a question of an approximation, because this force is in fact a sinusoid the parameters of which vary. In linear wave theory, this force is rather modelled as a superposition of sinusoids the parameters of which remain constant.

Alternatively, the excitation force of the wave may be modelled as the sum of two time-varying sinusoidal signals:

$$f_{ex}(t) = A_1(t)\sin(w_1(t)t + \phi_1(t)) + A_2(t)\sin(w_2(t)t + \phi_2(t))$$

The parameters of the model of the excitation force of the (time-varying) wave are to be estimated. Since they propagate nonlinearly through the above equation, it is a question of a nonlinear estimation problem.

A method based on a UKF may be used to estimate $A(t)$, $w(t)$ and $\phi(t)$.

It will be noted that other nonlinear estimation methods, such as the extended Kalman filter (EKF) or the particle filter, may be used to carry out this step, but that the UKF yields particularly good results. The use of the EKF for this purpose has in particular been mentioned in the literature.

To apply the UKF, the equation modelling the excitation force in state form and in discrete time is firstly formulated.

Let $T_s$ be the sampling period with which the filter must work. The excitation force of the wave will then be estimated in discrete time $t = kT_s$, $k = 0, 1, 2, \ldots$, which will simply be denoted k.

Defining $$\begin{cases} x_1(k) = A\,\sin(kT_s\omega + \phi), \\ x_2(k) = A\,\cos(kT_s\omega + \phi) \\ x_3(k) = \omega \end{cases}$$

and assuming that w(k) changes slowly over time (with respect to the sampling period), it is possible to formulate the model in the following state form:

$$\begin{cases} \begin{bmatrix} x_1(k) \\ x_2(k) \\ x_3(k) \end{bmatrix} = \begin{bmatrix} \cos(T_s x_3(k-1)) & \sin(T_s x_3(k-1)) & 0 \\ -\sin(T_s x_3(k-1)) & \cos(T_s x_3(k-1)) & 0 \\ 0 & 0 & 1 \end{bmatrix} \begin{bmatrix} x_1(k-1) \\ x_2(k-1) \\ x_3(k-1) \end{bmatrix} + \begin{bmatrix} v_1(k-1) \\ v_2(k-1) \\ v_3(k-1) \end{bmatrix}, \\ f_{ex}(k) = \begin{bmatrix} 1 & 0 & 0 \end{bmatrix} \begin{bmatrix} x_1(k) \\ x_2(k) \\ x_3(k) \end{bmatrix} + \mu(k) \end{cases}$$

In this model, uncertainties have been added to take into account modelling errors. More particularly $v_1(k-1)$ and $v_2(k-1)$ serve to take into account the time-varying nature of $A(t)$, $w(t)$ and $\phi(t)$, which is not taken into account in the definition of the states $x_1(k)$ and $x_2(k)$. $v_3(k-1)$ is an uncertainty in the third state (the frequency to be estimated), which is naturally correlated with $v_1(k-1)$ and $v_2(k-1)$. $\mu(k)$ is an uncertainty that may be likened to an error in the measurement of $f_{ex}(k)$, which serves to take into account the fact that $f_{ex}(k)$ is not exactly a sinusoid.

Denoting $$x(k) = [x_1(k)\ x_2(k)\ x_3(k)]^T,$$
$$v(k) = [v_1(k)\ v_2(k)\ v_3(k)]^T,$$
$$y(k) = f_{ex}(k)$$

and $$\begin{cases} A_x = \begin{bmatrix} \cos(T_s x_3(k-1)) & \sin(T_s x_3(k-1)) & 0 \\ -\sin(T_s x_3(k-1)) & \cos(T_s x_3(k-1)) & 0 \\ 0 & 0 & 1 \end{bmatrix}, \\ C = \begin{bmatrix} 1 & 0 & 0 \end{bmatrix} \end{cases}$$

the equations of the state model may be written:

$$\begin{cases} x(k) = A_x x(k-1) + v(k), \\ y(k) = Cx(k) + \mu(k) \end{cases}$$

The following assumptions are made:
the initial state $x(0)$ is a random vector of mean $m(0) = E[x(0)]$ and of covariance $P(0) = E[(x(0)-m(0))(x(0)-m(0))^T]$;
$v(k)$ and $\mu(k)$ are Gaussian noises with covariance matrices Q and R, respectively;
and the following notations are employed:
$x(k|k-1)$ is the estimate of $x(k)$ based on the measurements up to the time $k-1$, i.e. $y(k-1), y(k-2), \ldots$
$x(k|k)$ is the estimate of $x(k)$ based on the measurements up to the time k, i.e. $y(k), y(k-1), \ldots$
$P_x(k|k-1)$ is the covariance matrix of $x(k)$ based on the measurements up to the time $k-1$, i.e. $y(k-1), y(k-2), \ldots$
$P_x(k|k)$ is the covariance matrix of $x(k)$ based on the measurements up to the time k, i.e. $y(k), y(k-1), \ldots$ There are three steps in the UKF method:

1. Calculating the Sigma Points

In this first step, in the state space, a set of samples, called Sigma points, which represent well the probabilistic distribution of the state given its mean and covariance parameters, is calculated.

Namely $$W_0^m = \frac{\lambda}{n+\lambda},$$

$$W_0^c = \frac{\lambda}{n+\lambda} + (1 - \alpha^2 + \beta),$$

$$W_j^m = W_j^c = \frac{\lambda}{2(n+\lambda)}, j = 1, 2, \ldots, 2n$$

where $\lambda=(\alpha^2-1)n$ is a scaling parameter, $\alpha$ is a parameter that determines the scatter of the Sigma points about x(k−1|k−1) and which is generally given a low positive value, for example $10^{-3}$, and $\beta$ is a parameter used to incorporate a priori knowledge of the distribution of x: for a Gaussian distribution, $\beta=2$ is optimal.

At the time k−1, the following choice of Sigma points (set of points that encode the mean and variance information exactly) is considered:

$x_0(k-1)=x(k-1|k-1),$ $x_i(k-1)=x(k-1|k-1)+\sqrt{n+\lambda}S_i(k-1), i=1,2,\ldots,n$ $x_{i+n}(k-1)=x(k-1|k-1)-\sqrt{n+\lambda}S_i(k-1), i=1,2,\ldots,n$ where $S_i(k-1)$ is the i-th column of the matrix square root of $P_x(k-1|k-1)$, i.e. $P_x(k|k-1)=S(k-1)^T S(k-1)$.

2. Updating the Predictions

Each Sigma point is propagated through the nonlinear model that represents the variation in the states:

$x_j(k|k-1)=A_x x_j(k-1), j=0,1,\ldots,2n$

The mean and covariance of $\hat{x}(k|k-1)$, the prediction of x(k|k−1) are $\hat{x}(k|k-1)=\Sigma_{j=0}^{2n} W_j^m \hat{x}_j(k|k-1),$ $P_x(k|k-1)=\Sigma_{j=0}^{2n} W_j^c (\hat{x}_j(k|k-1)-x(k|k-1))(\hat{x}_j(k|k-1)-x(k|k-1))^T+Q.$ The predicted states $\hat{x}_j(k|k-1)$ are used in the output state equation, this giving:

$\hat{y}_j(k|k-1)=C\hat{x}_j(k|k-1)$

The mean and covariance of $\hat{y}(k|k-1)$ are calculated as $\hat{y}(k|k-1)=\Sigma_{j=0}^{2n} W_j^m \hat{y}_j(k|k-1),$ $P_y(k|k-1)=\Sigma_{j=0}^{2n} W_j^c (\hat{y}_j(k|k-1)-y(k|k-1))(\hat{y}_j(k|k-1)-y(k|k-1))^T+R$ whereas the cross-covariance between $\hat{x}(k|k-1)$ and $\hat{y}(k|k-1)$ is:

$$P_{xy}(k|k-1) = \sum_{j=0}^{2n} W_j^c (\hat{x}_j(k|k-1) - x(k|k-1))(\hat{y}_j(k|k-1) - y(k|k-1))^T$$

3. Updating Based on the Measurements

As in the Kalman filter, the final estimation of the state is obtained by correcting the prediction with feedback on the error in the prediction of the (measured) output:

$\hat{x}(k)=\hat{x}(k|k-1)+K(\hat{y}(k)-\hat{y}(k|k-1))$ where the gain K is given by $K=P_{xy}(k|k-1)P_y(k|k-1)^{-1}$ The a posteriori covariance in the estimation is updated with the following formula:

$P_x(k|k)=P_x(k|k-1)-KP_y(k|k-1)K^T$

Step 4) Determining the Control Value (COEFF)

In this step, the control value (setpoint) of the force exerted by the power take-off on the movable float is determined in order to maximize the power generated by the power take-off. This value is determined by use of a variable-gain control law having at least a proportional component, the coefficients (variable gains) of which are determined depending on the dominant frequency of the force exerted by the swell on the movable means. By "a control law having at least a proportional component" what is meant is: either a proportional (P) control law, or a proportional-integral (PI) control law, or a proportional-integral-derivative (PID) control law.

According to the invention, the control value is determined by the following steps:

4.1) determining the impedance of the movable float and uncertainty intervals of the impedance of the power take-off 4.2) maximizing the harvested energy by defining and solving a semidefinite-positive optimization problem 4.1) Determining the Impedance of the Movable Float and Uncertainty Intervals of the Impedance of the Power Take-Off In this step, the impedance of the movable float (that is its intrinsic resistance and reactance), and the impedance uncertainty intervals of the power take-off (i.e. of its intrinsic resistance and reactance) are determined.

A dynamic force-speed model of this type of system may be written in frequency form, as explained in reference texts on the interaction between ocean waves and oscillating systems (for example in the document Falnes, J. "Ocean Waves and Oscillating Systems: Linear Interactions Including Wave Energy Extraction". Cambridge university press, 2002):

$$\left(j\omega M + Z_r(j\omega) + \frac{K_h}{j\omega}\right) v(j\omega) = f_{ex}(j\omega) - f_{pto}(j\omega)$$

$$f_{pto}(j\omega) = W_{pto}(j\omega) f_u(j\omega)$$

This model is based on the integro-differential Cummins equation, and its coefficients $K_h$ and $Z_r(j\omega)$ (and those that result from its decomposition below) may be calculated using hydrodynamic codes based on the boundary element method (BEM), such as WAMIT, Diodore or NEMOH. The radiation impedance $Z_r(j\omega)$ which, in linear wave theory, describes the effect of the free movement of the float in the water, is the result of approximating the radiation impulse response with an infinite-impulse-response filter. It may be decomposed as follows:

$Z_r(j\omega)=B_r(\omega)+j\omega(M_r(\omega)+M_\infty)$

The speed of the float, depending on the forces that are applied thereto, may be rewritten:

$$v(j\omega) = \frac{1}{Z_j(j\omega)}(f_{ex}(j\omega) - W_{pto}(j\omega) f_u(j\omega))$$

where the intrinsic impedance $Z_i(jw)$ is defined as $$Z_i(j\omega) = j\omega M + MZ_r(j\omega) + \frac{K_h}{j\omega} =$$

$$B_r(\omega) + j\omega\left(M + M_\infty + M_r(\omega) - \frac{K_h}{\omega^2}\right) = R_i(\omega) + jX_i(\omega)$$

where $$\begin{cases} R_i(\omega) = B_{pa}(\omega) \\ X_i(\omega) = \omega\left(M + M_\infty + M_r(\omega) - \frac{K_h}{\omega^2}\right) \end{cases}$$

are the intrinsic resistance and reactance (real part and imaginary part of the impedance) of the movable portion of the wave-energy-converter system, respectively.

It is sought to optimize the performance, of the control law that is of interest here, in terms of maximization of the power generated on average $P_a$:

$$P_a = \frac{1}{T}\int_{t=0}^{T} f_{pto}(t)v(t)dt$$

It will be noted that, with this definition, it is the mechanical power extracted by the primary converter that is maximized. For a P control law, this power corresponds to the electrical power generated by the power take-off, whatever its efficiency. According to one implementation of the invention, for a PI control law, the electrical power may be maximized while neglecting mechanical-electrical conversion losses in the power take-off.

In the prior art, the power take-off is generally considered not to have dynamics, that is $W_{pto}(jw)=1$, $\forall w$, where $W_{pto}$ is the transfer function between $f_u$ and $f_{pto}$, this considerably simplifying the calculation of the optimal value of the force setpoint $f_u(t)$. In fact, depending on the type of power take-off used, its dynamics may prove to be slow with respect to those of the primary converter (movable means) of the wave-energy-converter system and to be impossible to neglect. According to the invention, the dynamics of the power take-off are therefore taken into account in the model, in the same frequency form as the main dynamics of the wave-energy-converter system:

$$W_{pto}(jw) = R_{pto}(w) + jX_{pto}(w)$$

To this end, it is possible to describe the uncertainties in the dynamics in the frequency domain as follows:
For the power take-off:

$$\begin{cases} R_{pto}(\omega) \in [R_m(\omega), R_M(\omega)] \\ X_{pto}(\omega) \in [X_m(\omega), X_M(\omega)] \end{cases}$$

For the movable float of the wave-energy-converter system:

$$\begin{cases} R_i(\omega) \in [R_{im}(\omega), R_{iM}(\omega)] \\ X_i(\omega) \in [X_{im}(\omega), X_{iM}(\omega)] \end{cases}$$

The limits of the intervals of the uncertainties may be identified experimentally. Alternatively, the limits of the intervals of the uncertainties may be estimated for a given model.

4.2) Maximizing the Harvested Energy via a Semidefinite-Positive Optimization Problem In this step, at least one coefficient of the variable-gain control law having a proportional component is determined. The coefficient of the control law is determined so as to maximize the power generated by the power take-off. This maximization is achieved by a semidefinite-positive (SDP) optimization that in particular takes into account the uncertainty intervals.

Semidefinite-positive optimization is a convex type of optimization, i.e. a linear optimization. In an SDP optimization problem, the unknown is a symmetric matrix that is required to be semidefinite and positive. As in linear optimization, the criterion to be minimized is linear and the unknown must also meet an affine constraint. Such an SPD optimization problem allows maximization of the generated power to be solved, because the cost function originally used for this maximization is neither concave nor convex (and therefore difficult to solve) as uncertainty intervals and the dynamics of the power take-off are taken into account.

In addition, since uncertainties are taken into account via a control law having at least a proportional component, it is possible to achieve a robust control (i.e. one that is less sensitive to uncertainties), this allowing the harvest of energy to be optimized whatever the way in which the wave-energy-converter system operates.

Advantageously, the semidefinite-positive optimization problem may optimize the worst case of operation of the wave-energy-converter system among all the possible behaviors of the system induced by the dynamic uncertainties defined above.

According to one implementation of the invention, at least the impedance of the control law is determined by semidefinite-positive optimization, and then the coefficient(s) of the control law is (are) determined from the impedance of the control law.

According to one aspect of the invention, the semidefinite-positive optimization may be implemented by the Schur complement, which in particular allows the constraints to be written in the form of a linear matrix inequality, this facilitating solution of the optimization. In this way, computation time is limited, thus allowing the control to be carried out in real-time.

An example embodiment of this step is described below.

According to a first embodiment of the invention, the control law for controlling the hydrodynamics of a wave-energy-converter system may be a proportional (P) control law that may be written:

$$f_u(t) = K_p v(t)$$

According to a second embodiment of the invention, the control law for controlling the hydrodynamics of a wave-energy-converter system may be a proportional-integral (PI) control law that may be written:

$$f_u(t) = K_p v(t) + K_i \int_0^t v(\tau)d\tau$$

Namely, frequency by frequency, for the P control law:

$$f_u(j\omega) = K_p v(j\omega)$$

or, for the PI control law, $$f_u(j\omega) = K_p v(j\omega) + \frac{K_i}{j\omega} v(j\omega)$$

where the parameters $K_p$ and $K_i$ are calculated depending on the dominant frequency of the excitation force of the wave (determined in step 3)), to guarantee that the power generated is maximized for this frequency, in the worst case among all the possible behaviors of the system induced by the dynamic uncertainties defined above.

The power generated may be maximized on the basis of an analytical expression that relates, frequency by frequency, this power to the real part (resistance) and to the imaginary part (reactance) of the impedance achieved with the control law, assuming that the force applied by the power take-off is a linear feedback on the speed of the movable means of the wave-energy-converter system (general case of a P, PI or PID control law):

$$f_u(jw) = Z_c(jw)v(jw) = (R_c(w) + jX_c(w))v(jw)$$

where $$\begin{cases} R_c = Re\{Z_c\} \\ X_c = Im\{Z_c\} \end{cases}$$

are the resistance and reactance of the impedance of the control (or loading) law at a given frequency (the dominant frequency of the excitation force of the wave).

The analytical expression of the electrical power at this frequency may be written:

$$P_a = \frac{A^2(R_{pto}R_c - X_{pto}X_c)}{2((R_i + R_{pto}R_c - X_{pto}X_c)^2 + (X_i + R_{pto}X_c + X_{pto}R_c)^2)}$$

where $R_i$ and $X_i$ are calculated at the frequency in question using the model of the wave-energy-converter system, the parameter A may be obtained from the estimation of the force of the wave (but, as shown below, it is not necessary to calculate it), $R_{pto}$ and $X_{pto}$ are uncertain parameters limited and $R_c$ and $X_c$ are to be determined for the very same frequency by solving the following optimization problem:

$$\max_{R_c, X_c} \min_{R_{PTO}, X_{pto}} \frac{R_{pto}R_c - X_{pto}X_c}{(R_i + R_{pto}R_c - X_{pto}X_c)^2 + (X_i + R_{pto}X_c + X_{pto}R_c)^2}$$

which corresponds to maximizing the power defined above. It will be noted that the parameter A may be omitted because it does not influence the optimal solution.

This optimization is difficult to solve, because the cost function is not convex or concave everywhere and the parameters $R_{pto}$ and $X_{pto}$ are not known with precision (it is just assumed that they are comprised in a certain interval). In order to make this problem tractable, it is converted into a semidefinite-positive (and therefore convex) optimization.

For each dominant swell frequency and each $R_{pto}$ and $X_{pto}$, the following condition is set $$R_{pto}R_c - X_{pto}X_c > 0$$

in order that the extracted average power be positive. This condition is met if and only if $$\begin{cases} R_m R_c - X_m X_c > 0 \\ R_M X_c - X_M X_c > 0 \end{cases}$$

With these constraints, the cost defined above is positive, and it is possible to solve an equivalent min-max optimization problem with the inverse of the cost function:

$$\min_{R_c, X_c} \max_{R_{PTO}, X_{pto}} \frac{(R_i + R_{pto}R_c - X_{pto}X_c)^2 + (X_i + R_{pto}X_c + X_{pto}R_c)^2}{R_{pto}R_c - X_{pto}X_c}$$

It is possible to show that this type of quadratic to linear cost function is convex. The min-max problem may therefore be converted into a convex optimization defined as follows, for each $R_c$ and each $X_c$:

$$\max_{\gamma, R_c, X_c} \{\gamma\}, \text{ such that } \gamma \geq \frac{(R_i + R_{pto}R_c - X_{pto}X_c)^2 + (X_i + R_{pto}X_c + X_{pto}R_c)^2}{R_{pto}R_c - X_{pto}X_c}$$

Although convex, it is still a difficult problem to solve because of the uncertain parameters $R_{pto}$ and $X_{pto}$.

To attack this problem, a semidefinite-positive optimization that is an extension of linear programming (LP) and that consists in optimizing a function under constraints defined by linear matrix inequalities (LMIs) is carried out.

An LMI is a condition of the form:

$F(x) \succ 0$ (the notations $\succ 0$ and $\succeq 0$ indicate that the matrix F is positive and definite or semidefinite, respectively)

where x is a vector of size n, and the matrix F(x) is affine in x, i.e.:

$$F(x) = F_0 + \sum_{i=1}^{n} F_i x_i$$

where $F_i$ are symmetric matrices of size m×m.

The advantage of defining problems based on LMIs is that there are at the current time many computational tools available that allow these problems to be rapidly solved (in polynomial time, i.e. they do not hang with the size of the problem), such as YALMIP and CVX.

A mathematical tool suitable for treating LMIs is the Schur complement, which indicates that the following non-linear matrix inequality:

$$\begin{cases} R(x) \succ 0, \\ P(x) - Q(x)^T R(x)^{-1} Q(x) \succ 0 \end{cases}$$

may be written equivalently in LMI form:

$$\begin{bmatrix} P(x) & Q(x)^T \\ Q(x) & R(x) \end{bmatrix} \succ 0$$

For the method according to the invention, the Schur complement in particular allows the constraints $$\gamma \geq \frac{(R_i + R_{pto}R_c - X_{pto}X_c)^2 + (X_i + R_{pto}X_c + X_{pto}R_c)^2}{R_{pto}R_c - X_{pto}X_c}$$

to be written in the LMI form $$\begin{bmatrix} \gamma & R_i + R_{pto}R_c - X_{pto}X_c & X_i + R_{pto}X_c + X_{pto}R_c \\ R_i + R_{pto}R_c - X_{pto}X_c & R_{pto}R_c - X_{pto}X_c & 0 \\ X_i + R_{pto}X_c + X_{pto}R_c & 0 & R_{pto}R_c - X_{pto}X_c \end{bmatrix} \succeq 0,$$

This condition is met if and only if the following two conditions, in which the limits $R_m$, $R_M$, $X_m$ and $X_M$ of the uncertainty intervals of the parameters $R_{pto}$ and $X_{pto}$ appear, are met:

$$\begin{bmatrix} \gamma & R_i + R_m R_c - X_m X_c & X_i + R_m X_c + X_m R_c \\ R_i + R_m R_c - X_m X_c & R_m R_c - X_m X_c & 0 \\ X_i + R_m X_c + X_m R_c & 0 & R_m R_c - X_m X_c \end{bmatrix} \succeq 0,$$

$$\begin{bmatrix} \gamma & R_i + R_M R_c - X_M X_c & X_i + R_M X_c + X_M R_c \\ R_i + R_M R_c - X_M X_c & R_M R_c - X_M X_c & 0 \\ X_i + R_M X_c + X_M R_c & 0 & R_M R_c - X_M X_c \end{bmatrix} \succeq 0$$

By taking these two conditions as constraints for $$\min_{\gamma, R_c, X_c} \{\gamma\},$$

a semidefinite-positive (SDP) optimization is obtained, which may be rapidly solved, in particular with the aforementioned software packages.

The steps for determining the coefficients of the robust control law may be summarized as follows:

I. The resistance $R^*_c$ and reactance $X^*_c$ of the robust optimal control are calculated:
1. A set of representative frequencies $0 < w_1 < \ldots < w_N$ is selected, these representative frequencies corresponding to a set of frequencies that covers the range of the dominant frequencies of the sea states in which the wave-energy-converter system is supposed to work.
2. For each frequency in this set
   1.1. The intrinsic resistance and reactance $R_i$ and $X_i$ of the primary converter (movable portion) of the wave-energy-converter system are calculated
   1.2. The limits $R_m$, $R_M$, $X_m$ and $X_M$ of the uncertainty intervals of the uncertain parameters of the power take-off are identified
   1.3. $R^*_c$ and $X^*_c$ are calculated by solving the semidefinite-positive optimization problem $$\min_{\gamma, R_c, X_c} \{\gamma\},$$

such that $$\begin{bmatrix} \gamma & R_i + R_m R_c - X_m X_c & X_i + R_m X_c + X_m R_c \\ R_i + R_m R_c - X_m X_c & R_m R_c - X_m X_c & 0 \\ X_i + R_m X_c + X_m R_c & 0 & R_m R_c - X_m X_c \end{bmatrix} \succeq 0,$$

$$\begin{bmatrix} \gamma & R_i + R_M R_c - X_M X_c & X_i + R_M X_c + X_M R_c \\ R_i + R_M R_c - X_M X_c & R_M R_c - X_M X_c & 0 \\ X_i + R_M X_c + X_M R_c & 0 & R_M R_c - X_M X_c \end{bmatrix} \succeq 0,$$

II. The coefficients of the control law are determined

For a proportional (P) control law, the control impedance of which is $Z_c(jw) = K_p$, the optimal value of the proportional gain is: $K^*_p(\hat{w}_{ex}) = R^*_c(\hat{w}_{ex})$ for the estimated dominant swell frequency $\hat{w}_{ex}$.

For a proportional-integral (PI) control law, the control impedance of which is $$Z_c(j\omega) = K_P + \frac{K_i}{j\omega},$$

the optimal values of the gains are $$\begin{cases} K^*_p(\hat{\omega}_{ex}) = R^*_c(\hat{\omega}_{ex}) \\ K^*_i(\hat{\omega}_{ex}) = -\hat{\omega}_{ex} X^*_c(\hat{\omega}_{ex}) \end{cases}$$

According to one embodiment of the invention, step 4) may take into account the efficiency of the power take-off so as to obtain a more precise control of the wave-energy-converter system.

In particular, in the case of proportional (P) control, maximizing the average mechanical power (as required by the criterion used for the synthesis of the control law) corresponds to also maximizing the generated average electrical power. In contrast, in the case of proportional-integral (PI) control, this is true only if it is possible to consider the conversion efficiency of the power take-off to be ideal. If this approximation is not realistic, it is possible to maximize $$P_e = \frac{1}{T} \int_{t=0}^{T} \eta f_u(t) v(t) dt$$

by introducing a coefficient $\eta$ that represents the efficiency of the power take-off, which may be defined as a function of the instantaneous mechanical power $$\eta(f_{pto} v) = \begin{cases} \eta_p & \text{si } f_{pto} \geq 0 \\ \eta_n & \text{si } f_{pto} v < 0 \end{cases}$$

It is possible in principle to also find a robust proportional-integral (PI) control law that maximizes the electrical energy generated in the worst case defined by the uncertainties in the dynamics of the power take-off (or of the movable portion of the wave-energy-converter system), in the presence of a power take-off of non-ideal efficiency.

Step 5) Controlling the Power Take-Off (COM)

In this step, the power take-off is controlled depending on the value determined in the preceding step. To do this, the power take-off (electrical or hydraulic machine) is actuated so that it applies the new value of the force setpoint $f_u$ of the power take-off to the movable float, that is the value such as determined in step 4).

For example, it is possible to apply, to the control system of the electrical machine, the new expression of the control of the force $f_u$ that allows a force $f_{pto}$ exerted by the power take-off on the movable float to be obtained. The electrical machine is controlled, by modifying, where appropriate, the electrical current applied to the electrical machine, so that it applies the force $f_{pto}$ that would correspond, if it were not for dynamics of the machine, to the requested control $f_u$. More precisely, to deliver a couple or force that drives the movable float, a current is applied while delivering an electrical power. In contrast, to produce a couple or force that resists the movement of the movable float, a current is applied while generating an electrical power.

Furthermore, the invention relates to a wave-energy-converter system that converts the energy of sea swell into electrical or hydraulic energy. The wave-energy-converter system comprises at least one movable float linked to a power take-off, the movable float making an oscillatory movement with respect to the power take-off. According to the invention, the wave-energy-converter system controls the wave-energy-converter system to implement the control method according to any one of the combinations of variants described above.

According to one embodiment of the invention, the control performs computations.

Figure 2:
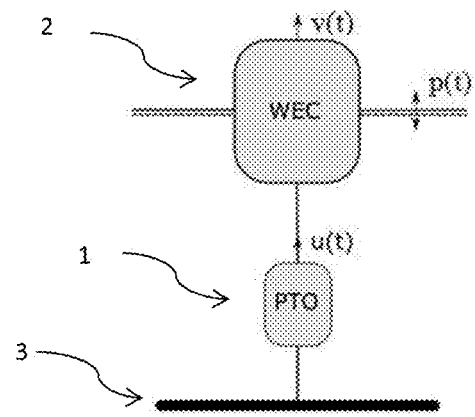
FIG. 2 illustrates a wave-energy-converter system according to one example embodiment.

One nonlimiting example of a wave-energy-converter system is an oscillating buoy such as shown in FIG. 2. This wave-energy-converter system comprises a buoy 2 by way of movable float of mass m, and a power take-off 1 with its control law. The buoy is subjected to an oscillatory movement by the waves (which generates a movement p of speed v of the buoy 2) and by the force u applied by the power take-off 1. The power take-off 1 may be an electrical machine connected to an electrical network 3.

Example of Application

The features and advantages of the method according to the invention will become more clearly apparent on reading about the following example of application.

In this example, a float such as described in FIG. 2 is considered, the force-speed dynamics (speed response to the sum of the forces applied to the float) of which are given by the following transfer function:

$$Z_i(s) = \frac{s^6 + 208.6 s^5 + 8.583 \cdot 10^4 s^4 + 8.899 \cdot 10^6 s^3 + 1.074 \cdot 10^8 s^2 + 7.031 \cdot 10^8 s}{1.44 s^7 + 300.4 s^6 + 1.237 \cdot 10^5 s^5 + 1.284 \cdot 10^7 s^4 + 1.652 \cdot 10^8 s^3 + 2.106 \cdot 10^9 s^{\wedge}2 + 9.988 \cdot 10^9 s + 6.539 \cdot 10^{10}}$$

Figure 3:
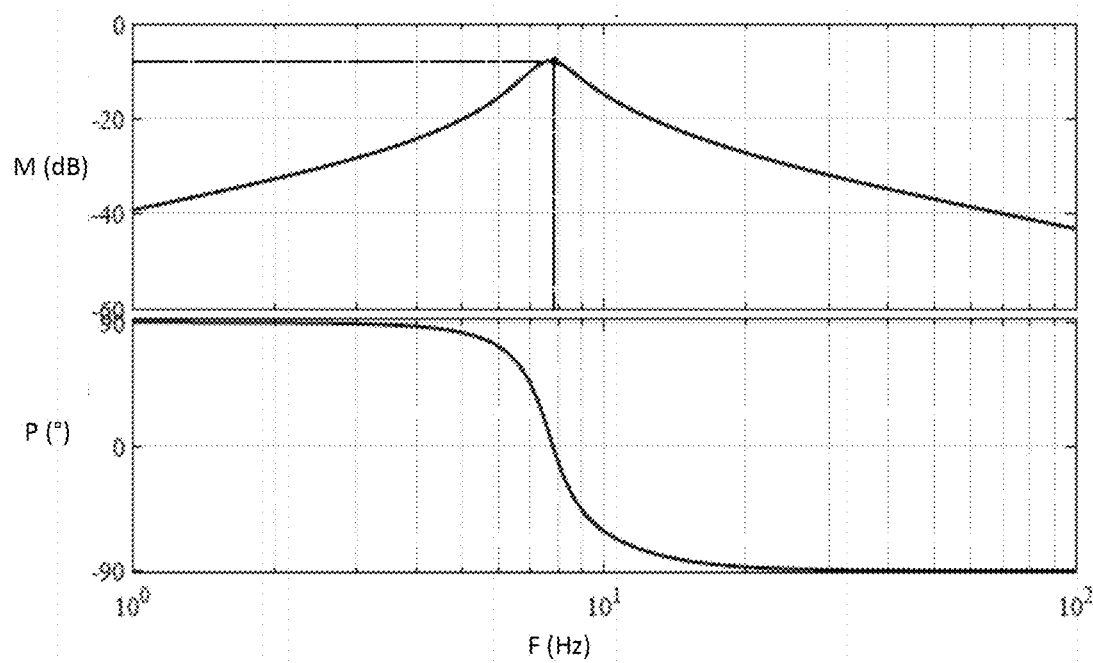
FIG. 3 illustrates the Bode plot of the transfer function of a wave-energy-converter system for one illustrative example.

This function gives the Bode plot of FIG. 3. The top part of FIG. 3 is a curve of amplitude M in dB as a function of frequency F in Hz. The bottom part of FIG. 3 is a curve of phase shift P in ° (degrees) as a function of frequency F in Hz. It is a question of a typical Bode plot for a wave-energy-converter system of the type with a point-like absorber. The transfer function describes the dynamics of a small-scale (1:20) prototype to which the method has been applied.

The dynamics of the power take-off (PTO) are described by a first-order transfer function:

$$W_{pto}(j\omega) = \frac{1}{j\omega\tau + 1}$$

the time constant of which is comprised in the interval $$\tau \in \left[\frac{1}{10\pi}, \frac{1}{2\pi}\right]$$

with a nominal value $$\tau_0 = \frac{1}{6\pi}$$

Figure 4:
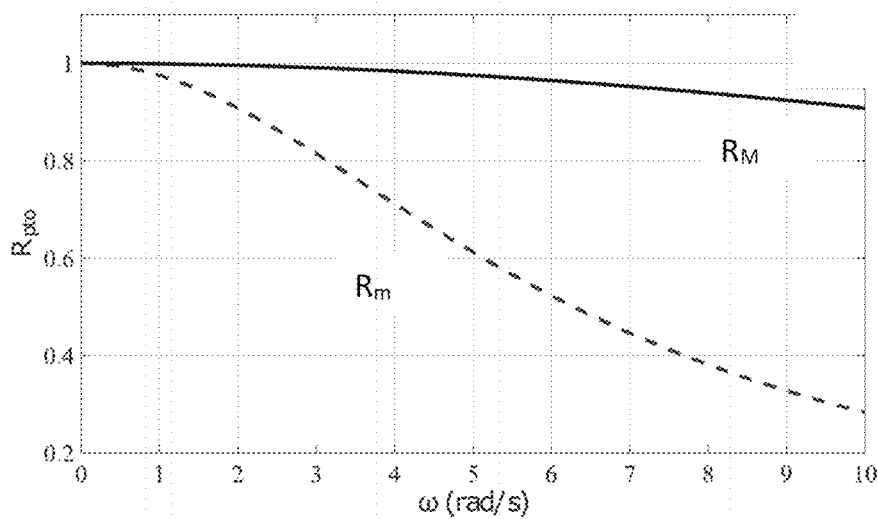
FIG. 4 illustrates the upper and lower limits of the uncertainties in the resistance of the power take-off for the illustrative example.
Figure 5:
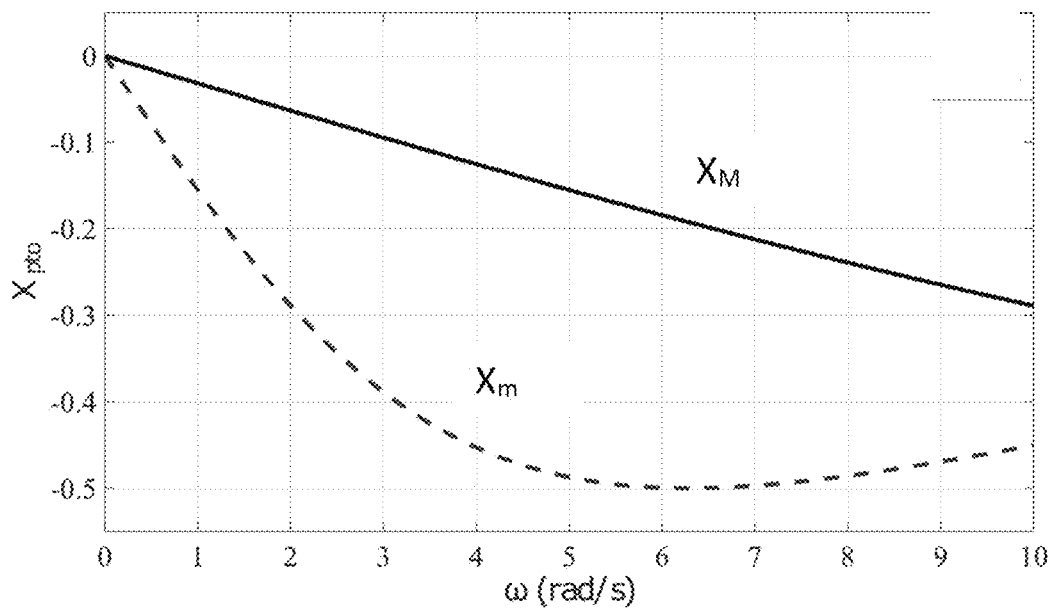
FIG. 5 illustrates the upper and lower limits of the uncertainties in the internal reactance of the power take-off for the illustrative example.

Based on the limits on r it is possible to calculate the limits on the real part and the imaginary part of $W_{pto}(jw)$ (FIGS. 4 and 5, respectively).

Specifically, FIG. 4 shows the real part $R_{pto}$ of the impedance of the power take-off as a function of the angular speed of the movable float ω in rad/s. The curve $R_M$ shows the upper limit of the real part of the impedance and the curve $R_m$ shows the lower limit of the real part of the impedance.

In addition, FIG. 5 shows the imaginary part $X_{pto}$ of the impedance of the power take-off as a function of the angular frequency of oscillation w in rad/s. The curve $X_M$ shows the upper limit of the imaginary part of the impedance and the curve $X_m$ shows the lower limit of the imaginary part of the impedance.

It will be noted that the intervals of the uncertainties vary greatly.

These uncertainty intervals allow the optimal values of the gains $K_p$ and $K_i$ to be calculated depending on frequency by applying the method of the invention.

Figure 6:
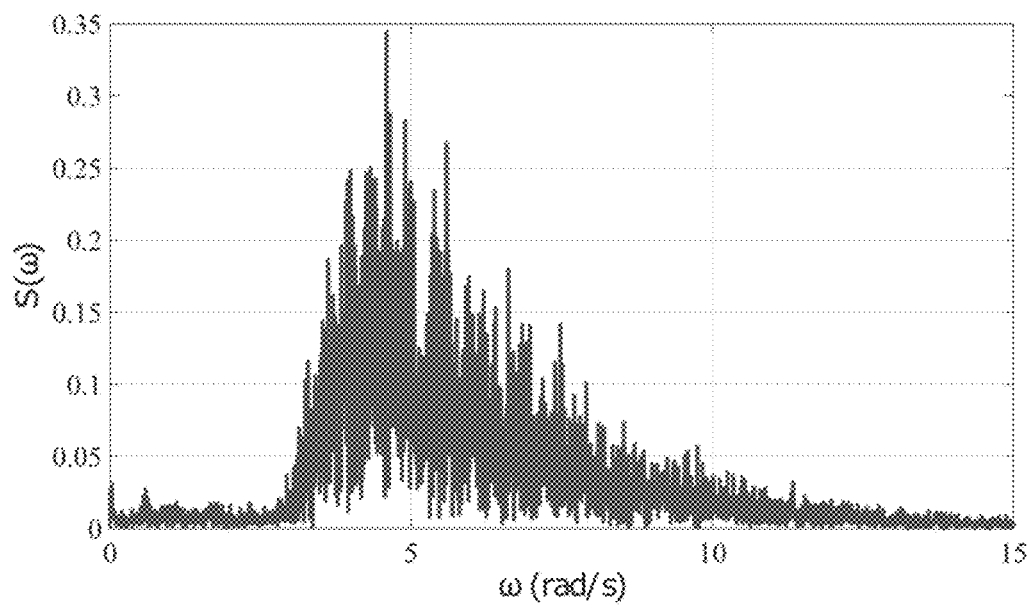
FIG. 6 illustrates a spectrum of an irregular wave used for the illustrative example.

To show the advantageousness of the invention, the results obtained with the robust PI control according to the invention have been compared by simulation with those obtained with a PI control according to the prior art designed based on the nominal dynamics of the power take-off, for various embodiments of these dynamics, on a given sea state. FIG. 6 gives the spectrum S of a given sea state for the simulations as a function of the angular speed ω of the movable float in rad/s.

The method according to the invention is applied for various embodiments of the dynamics of the power take-off in the uncertainty intervals illustrated in FIGS. 4 and 5 and for the sea state corresponding to the spectrum of FIG. 6.

Figure 7:
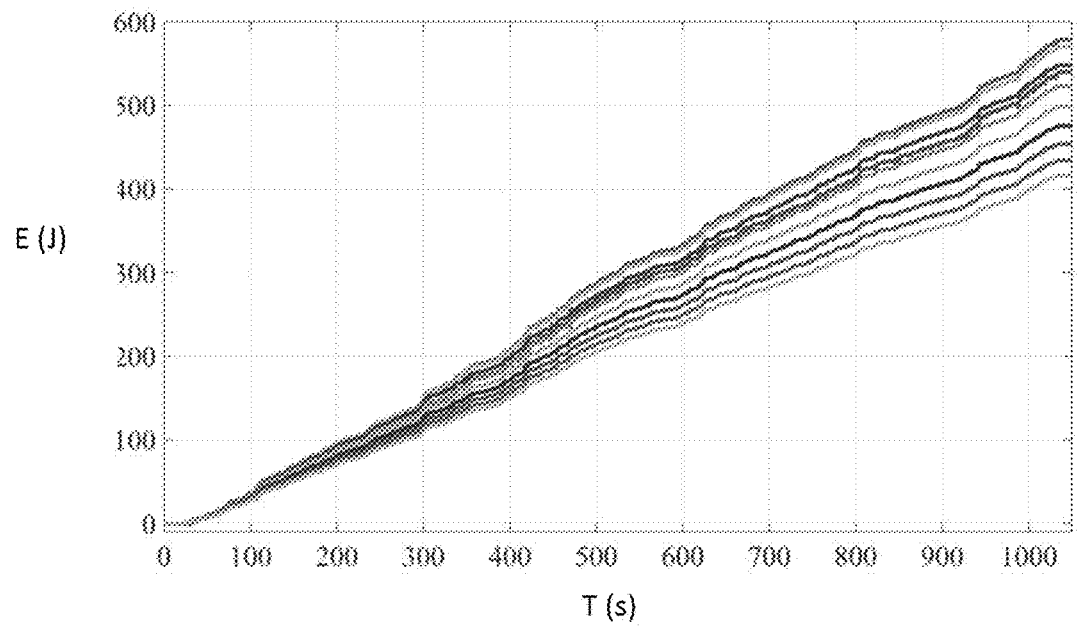
FIG. 7 illustrates the energy harvested for various embodiments of the dynamics of the power take-off in the uncertainty intervals for the illustrative example.

FIG. 7 illustrates the harvested energy E in J as a function of time T in seconds (s) for the various embodiments (each curve corresponds to one embodiment of the dynamics of the power take-off), the various embodiments being included in the uncertainty intervals illustrated in FIGS. 4 and 5. The method according to the invention therefore allows an optimization of the harvested energy for all the embodiments, i.e. in all the cases of operation of the wave-energy-converter system. The method according to the invention therefore allows robust control of the wave-energy-converter system. In addition, it will be noted that the energy harvested in the best case is almost 50% higher than the energy harvested in the worst case.

Figure 8:
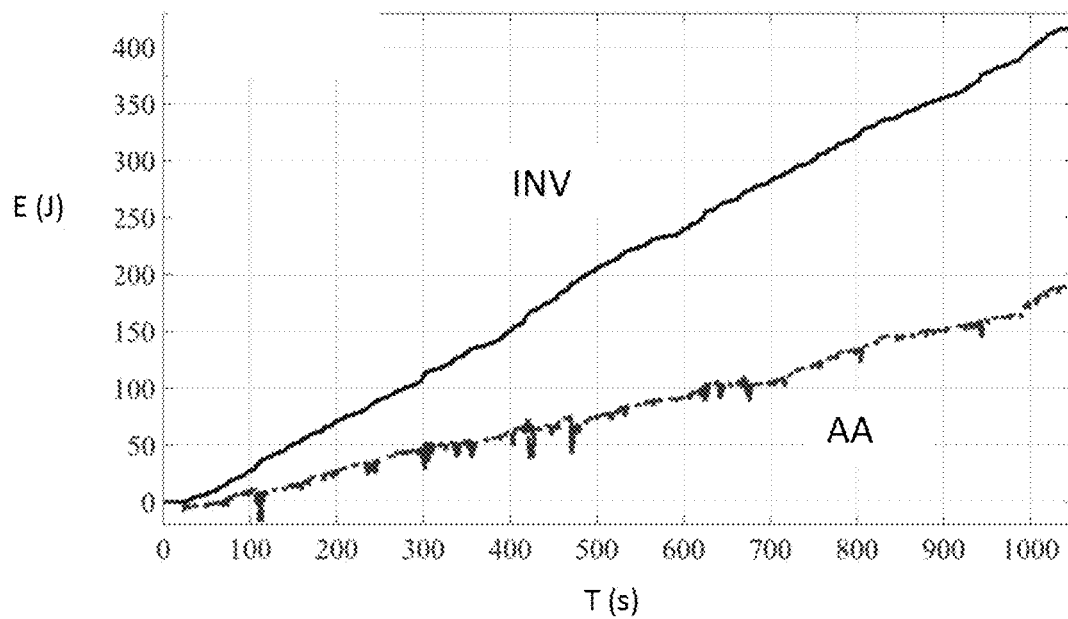
FIG. 8 is a comparative curve of the energy harvested by the method according to the invention and by a method according to the prior art for the illustrative example.

The method according to the invention is next compared to the prior-art method for the worst case. FIG. 8 illustrates the harvested energy E in J as a function of time T in s for the sea state illustrated in FIG. 6 for the worst case of operation of the wave-energy-converter system among all the possible behaviors of the system induced by the dynamic uncertainties. The curves of FIG. 8 correspond to the energy harvested for the robust control method according to the invention INV, and for the proportional-integral (PI) control method according to the prior art AA designed based on the nominal dynamics of the power take-off. It will be noted that the energy harvested with the method according to the invention is higher than the energy harvested with the method according to the prior art AA. The method according to the invention therefore indeed allows an optimized harvest of energy even in the worst case of operation of the wave-energy-converter system.

The invention claimed is:

1. A method for controlling a wave-energy-converter system that converts energy of sea swells into electrical or hydraulic energy, the wave-energy-converter system comprising at least one movable float linked to a power take-off, and the movable float making an oscillatory movement with respect to the power take-off comprising steps of:
   a) measuring at least one of position, speed and acceleration of the movable float;
   b) estimating the force exerted by the swell on the movable float from the measurement of at least one of position and speed of the movable float;
   c) determining at least one dominant frequency of the force exerted by the swell on the movable float, by an unscented Kalman filter;
   d) determining a control value for the force exerted by the power take-off on the movable float to maximize power generated by the power take-off by:
      i) determining intrinsic resistance for the at least one determined dominant frequency and determining reactance of the movable float, uncertainty intervals of the intrinsic resistance and reactance of the power take-off;
      ii) determining at least one coefficient of a variable-gain control law including a proportional component from a semidefinite-positive optimization of maximization of the power generated by the power take-off, the semidefinite-positive optimization accounting for the intrinsic resistance and reactance of the movable float and the uncertainty intervals of the intrinsic resistance and reactance of the power take-off; and
   e) controlling the power take-off with the control value.

2. The method according to claim 1, wherein the semidefinite-positive optimization optimizes a worst case of operation of the wave-energy-converter system, which is defined by the uncertainty intervals.

3. The method according to claim 1, wherein the semidefinite-positive optimization determines at least impedance of the control law, and determining the coefficient of a control law from the impedance of the control law.

4. The method according to claim 3, wherein the semidefinite-positive optimization is defined by an equation:

$$\min_{\gamma, R_c, X_c} \{\gamma\},$$

such that $$\begin{bmatrix} \gamma & R_i + R_m R_c - X_m X_c & X_i + R_m X_c + X_m R_c \\ R_i + R_m R_c - X_m X_c & R_m R_c - X_m X_c & 0 \\ X_i + R_m X_c + X_m R_c & 0 & R_m R_c - X_m X_c \end{bmatrix} \geq 0,$$

$$\begin{bmatrix} \gamma & R_i + R_M R_c - X_M X_c & X_i + R_M X_c + X_M R_c \\ R_i + R_M R_c - X_M X_c & R_M R_c - X_M X_c & 0 \\ X_i + R_M X_c + X_M R_c & 0 & R_M R_c - X_M X_c \end{bmatrix} \geq 0,$$

where $R_i$ is the resistance of the movable float, $X_i$ is the internal reactance of the movable float, $R_m$ is a lower limit of uncertainty in resistance of the power take-off, $R_M$ is an upper limit of uncertainty in resistance of the power take-off, $R_c$ is the real part of impedance of the control law, $X_c$ is an imaginary part of the impedance of the control law, $X_m$ is a lower limit of uncertainty in internal reactance of the power take-off and, $X_M$ is an upper limit of uncertainty in internal reactance of the power take-off.

5. The method according to claim 3, wherein the control law is a proportional control law, and the coefficient $K_p$ of the control law is determined from an equation $K^*_p(\hat{w}_{ex})=R^*_c(\hat{w}_{ex})$, where $\hat{w}_{ex}$ is a determined dominant frequency of the swell, $K^*_p$ is an optimal value of the coefficient $K_p$ and $R^*_c$ is an optimal value of a real part of impedance of the control law.

6. The method according to claim 5, wherein the proportional control law is expressed as: $f_u(t)=K_p v(t)$ where $f_u$ is force applied by the power take-off on the movable float, and v is a speed of the movable float with respect to the power take-off.

7. The method according to claim 3, wherein the control law is a proportional-integral control law, and wherein the coefficients $K_p$ and $K_i$ of the control law are determined from equations:

$$\begin{cases} K^*_p(\hat{\omega}_{ex}) = R^*_c(\hat{\omega}_{ex}) \\ K^*_i(\hat{\omega}_{ex}) = -\hat{\omega}_{ex} X^*_c(\hat{\omega}_{ex}) \end{cases}$$

where $\hat{w}_{ex}$ is a determined at least one dominant frequency of the swell, $K^*_p$ is the optimal value of the coefficient $K_p$, $R^*_c$ is an optimal value of a real part of the impedance of the control law, $K^*_i$ is an optimal value of the coefficient $K_i$ and $X^*_c$ is an optimal value of an imaginary part of the impedance of the control law.

8. The method according to claim 7, wherein the proportional integral control law is an equation:

$$f_u(t)=K_p v(t)+K_i p(t)$$

where $f_u(t)$ is control of force exerted by the power take-off on the movable float, v(t) is speed of the movable float, and p(t) is position of the movable float.

9. The method according to claim 1, wherein the power generated by the power take-off is maximized by taking into account efficiency of the power take-off.

10. The method according to one claim 1, wherein the dominant frequency of the force exerted by the swell on the movable float is determined by a model modelling the force exerted by the swell on the movable float as a sinusoidal signal, or as the sum of two sinusoidal signals.

11. The method according to claim 1, wherein one of the position and speed of the movable float is estimated using a dynamic model modelling variation in position and speed of the movable float.

12. The method according to claim 11, wherein the dynamic model comprises a model of radiation force.

13. The method according to claim 1, wherein the power take-off is an electrical machine or a hydraulic machine.

14. A wave-energy-converter system that converts energy of sea swells into electrical or hydraulic energy, comprising at least one movable float linked to a power take-off, and the movable float makes an oscillatory movement with respect to the power take-off, wherein the wave-energy-converter system comprises a control for controlling the wave-energy-converter system able to implement the control method according to claim 1.

\* \* \* \* \*